June 30, 1970  D. B. LEATHEM  3,518,485

SWITCH-CONTROLLED DUAL FUNCTION INDICATOR

Filed April 14, 1967

Inventor:
Douglas B. Leathem
by Gordon Needleman
Atty.

1

3,518,485
SWITCH-CONTROLLED DUAL FUNCTION
INDICATOR
Douglas B. Leathem, Natick, Mass., assignor, by mesne assignments, to United-Carr Incorporated, Boston, Mass., a corporation of Delaware
Filed Apr. 14, 1967, Ser. No. 631,054
Int. Cl. H01j 1/60
U.S. Cl. 315—129         1 Claim

ABSTRACT OF THE DISCLOSURE

This application is directed at a controllable dual function indicator (that is capable of a continuous or flashing mode of operation) using an RC circuit or a silicon control rectifier circuit. The indicator uses two circuits, one of which includes a switch and a capacitor and which will place the neon bulb into intermittent operation when the switch is closed.

Background of the invention

In the past, two circuits and two bulbs were utilized to accomplish a dual function. One bulb was used to indicate that the activity had started, and a second bulb to indicate a change in the activity. The standard freezer pilot lamp can only show that power is available. On business machines, inexperienced operators pay little attention to continuous indicators which lead to the extensive use of buzzer systems.

One of the advantages of the dual function indicator is that it tends to reduce total lamp requirements. In addition, there are many cases where the dual function concepts can serve a unique purpose. For example, in order to avoid the difficulty found with the standard freezer pilot lamp, the dual function indicator could fulfill the purpose of showing that power was available by a continuous glow and also flashing a warning should the freezer temperature be at a dangerous level.

The dual function indicator could be used in a humidifier, the continuous mode to show normal operation and a flashing mode to indicate when the reservoir is empty. Two indicators are now used for this dual function.

The dual function indicator could be used in battery chargers and inverters with the steady continuous mode indicating normal function and the flashing mode indicating an overload or improper connection.

In cases where buzzers are used to call an operator, under emergency conditions, a dual function indicator could be used with the flashing mode in many cases providing adequate attention getting impact without undue distraction to others. In control systems chain reaction malfunctions presently cause many lamps on a control panel to light simultaneously. The dual function indicator could be used where the flashing mode would signify which event brought about the malfunctioning.

Description of the preferred embodiment

Figure 1:
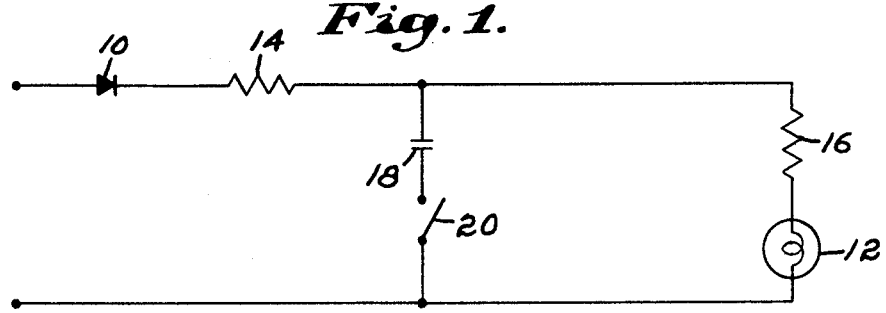
FIG. 1 is a schematic drawing of the RC dual indicator circuit.

FIG. 1 shows a dual function indicator circuit using an RC unit including a diode or rectifier 10, which receives an alternating current from the source and rectifies it. The peak inverse voltage of the diode 10, must be such as to insure that the capacitor 18 will reach the firing voltage of the lamp 12. It can be shown that the capacitor can never charge to more than one-half the peak inverse voltage of the diode 10. In our particular case, the minimum PIV rating of the diode is 250 volts. A timing resistor 14 is placed in series with the diode 10 and is utilized to regulate the capacitor charge rate in the flashing mode and limit the lamp current in the continuous mode. It is possible to flash the lamp 12 using values as high as 500K ohms for the timing resistor 14 although the lamp intensity in continuous mode would then be quite low. Capacitor leakage is a limiting factor for the timing resistor 14, on the high side, and its lower limit is determined by the current ratings of the neon lamp when operated in the continuous mode. For conventional high brightess indicators, the timing resistor 14, should have a value of 25K ohms or higher. The 68K timing resistor 14, used in the present circuit is a compromise between lamp brightness in the continuous mode and flash rate in the flashing mode. A current limiting resistor 16, is placed in series with the timing resistor 14, and with a high brightness neon lamp 12. The current limiting resistor 16, limits the peak current through the neon lamp in the flashing mode and in the sample circuit has a value of approximately 7K ohms. A capacitor 18, and switch 20, are placed in parallel with the current limiting resistor 16, and the neon lamp 12, as shown in FIG. 1.

Factors which govern the selection of the capacitor 18, include desired flash intensity and rate, lamp life, size, cost and durability. A practical range for capacitance runs from .1 mfd. to 2 mfd. The capacitor 18, should have a temperature rating which matches the expected flasher environment. As stated hereinbefore, a switch 20, is placed in series with the capacitor 18.

To achieve the flashing mode, the switch 20, is closed and the capacitor 18, would then be charged through the diode 10, and the timing resistor 14, and then discharged through the neon lamp 12, and the limiting resistor 16. Typically, the neon lamp 12, fires at about 110 volts and extinguishes at about 70 volts. Each of these voltages will increase about 10 volts over the life of the lamp.

Stated in a different way, as the current passes through the timing resistor 14, it will, according to its value, regulate the time it takes to charge the capacitor 18, which in turn will control the flash rate. The discharge will take place through the current limiting resistor 16 and the lamp 12, thus lighting it.

Figure 2:
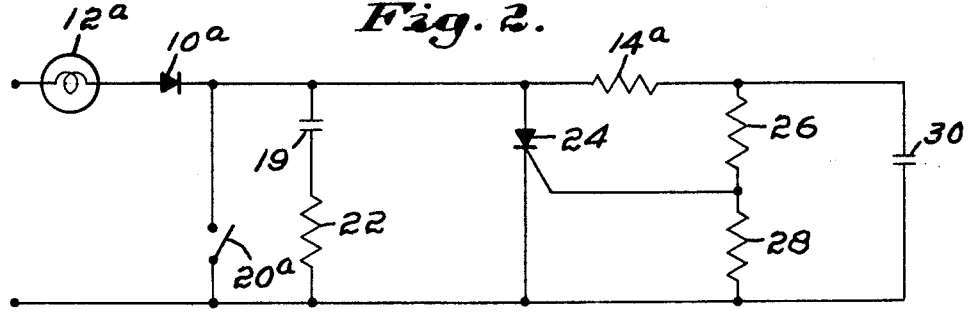
FIG. 2 is a schematic drawing of a silicon controlled rectifier dual function unit.

FIG. 2 shows a silicon control rectifier circuit which is more versatile than the RC unit described hereinbefore. This circuit shown in FIG. 2 comprises a neon or incandescent lamp 12a, which is operated at 70% of its rated voltage, thus extending its electrical life by a factor of 200. When low wattage, high voltage incandescent lamps are used, they should be protected from filament vibration. If a neon lamp is used, a single, 15K, ½ watt resistor (not shown) should be connected in parallel with the lamp. This resistor will allow current to flow to the timing circuit before the lamp fires. A diode 10a, having a peak inverse voltage rating of 250 volts, is then placed in series with the lamp 12a. A first branch includes a mode switch 20a and a second branch in parallel with the first branch provides a static filter and includes a capacitor 19. The capacitor 19 can be rated at .01 microfarad, and the filter network is then completed by having a 10 ohm resistor 22 in the series with the capacitor 19. The filter network prevents spurious triggering of the rectifier 10a due to voltage pulses on the power line. The third branch has the silicon control rectifier 24, which is connected to a predetermined point in a voltage divider pair of resistors 26, 28. A timing resistor 14a having a rating of 27K is placed in series with the diode 10a and lamp 12a and between the line connections of the silicon control rectifier 24, and the voltage divider pair 26, 28, as shown in FIG. 2.

A second capacitor 30 was selected experimentally to yield a 50% duty cycle and to be compatible with the optimum value of the timing resistor 14a. The second capacitor 30 having a rating of 25 microfarads is placed in parallel with the voltage divider pair 26, 28 and the silicon control rectifier and the capacitor and having a 10a and the timing resistor 14a.

In operation, the second capacitor 30 is charged through the lamp 12a, the diode 10a, and the timing resistor 14a. The voltage divider 26, 28 provides a reduced voltage to the gate of the silicon control rectifier 24. When this reduced voltage reaches approximately .6 volt, the SCR triggers on and the bulk 12a lights. Tre second capacitor 30 now supplies a DC current through the timing resistor 14a and the SCR to ground. The SCR 24 will continue to conduct until the current from the discharging second capacitor 30 drops below the minimum DC holding current for the SCR. When operated in the continuous mode, the mode switch 20a is thrown bypassing everything except the diode 10a and the lamp 12a.

I claim:

1. A dual function indicator circuit utilizing alternating current power supply comprising a lamp serially connected to a diode, a timing resistor, a capacitor, a silicon control rectifier connected in shunt with the capacitor between the diode and a voltage divider pair of resistors which are in turn connected in shunt with the silicon control rectifier and the capacitor and having a switch in shunt with the silicon control rectifier whereby when the switch is open the bulb will glow intermittently and when the switch is closed the bulb will glow steadily.

References Cited

UNITED STATES PATENTS

| | | | |
|---|---|---|---|
| 2,934,752 | 4/1960 | Arrasmith | 340—213 |
| 2,956,466 | 10/1960 | Ensign et al. | 74—503 |
| 3,247,402 | 4/1966 | Hayden | 307—132 |
| 3,290,454 | 12/1966 | Hubert | 200—5 |
| 3,349,284 | 10/1967 | Roberts | 315—223 |
| 3,334,270 | 8/1967 | Nuckolls | 315—171 |

JOHN W. HUCHERT, Primary Examiner

S. BRODER, Assistant Examiner

U.S. Cl. X.R.

315—209; 200—167

UNITED STATES PATENT OFFICE
CERTIFICATE OF CORRECTION

Patent No. 3,518,485                                June 30, 1970

Douglas B. Leathem

It is certified that error appears in the above identified patent and that said Letters Patent are hereby corrected as shown below:

Column 1, line 34, "concepts" should read -- concept --. Column 3, line 6, "and the capacitor and having a" should read -- 24, and in series with the diode --; line 13, "Tre" should read -- The --. Column 4, line 12, "2,956,466" should read -- 2,956,446 --.

Signed and sealed this 23rd day of February 1971.

(SEAL)
Attest:

Edward M. Fletcher, Jr.                          WILLIAM E. SCHUYLER, JR.
Attesting Officer                                     Commissioner of Patents